Aug. 18, 1970 TAKEO MIURA ET AL 3,524,978
CURVE-PLOTTING SYSTEM WITH INTERPOLATION
Filed Aug. 25, 1967 5 Sheets-Sheet 1

3,524,978
CURVE-PLOTTING SYSTEM WITH
INTERPOLATION
Takeo Miura, Kokubunji-shi, Junzo Iwata, Kodaira-shi, and Junji Tsuda, Hachioji-shi, Japan, assignors to Hitachi, Ltd., Chiyoda-ku, Tokyo-to, and Hitachi Electronics Company, Ltd., Kodaira-shi, Japan
Filed Aug. 25, 1967, Ser. No. 663,313
Claims priority, application Japan, Sept. 9, 1966, 41/59,168, 41/59,169, 41/59,170; Apr. 19, 1967, 42/24,515
Int. Cl. G06g 7/30
U.S. Cl. 235—193   17 Claims

ABSTRACT OF THE DISCLOSURE

The intermediate figure between two given figures is interpolated be defining the midway points thereon corresponding to the predetermined midway points on the two given figures, by means of a data-processing system. The coordinate values of these midway points and the predetermined specific points on the intermediate figures are time-sequentially supplied to an analog operation system including circuits having a predetermined transfer lag, such as first or second order lag circuits, after digital to analog conversion, and the output analog signals for driving a curve indicator is produced by this analog operation system.

---

This invention relates to an electrical curve-interpolation system, and more particularly to a system for electrically interpolating intermediate figures between two given different figures of a movable curve, and still more particularly to a curve-plotting system which can be utilized in the above curve-interpolation system and other general purposes.

In the field of caricature movies and the like, it is required to manually draw numerous original pictures which are slightly different from each other, and thereafter to record them on a movie film, time-sequentially. This method, particularly the drawing of numerous original pictures needs enormous labor, time and expense.

For the purpose of eliminating these disadvantages, we have proposed an invention disclosed in the application Ser. No. 648,100 filed June 22, 1967, and assigned to the same assignees as the present application. According to this invention, component signals, each indicating a partial component of an original picture to be represented, are prepared by analogical operation circuits and combined time-sequentially under the control of a suitable sequence counter to drive an oscilloscope. Animation of the picture image on the screen of the oscilloscope can be carried out by selectively deforming the component signals. Though this method has the advantage that the picture image on the oscilloscope can be directly and optionally animated by an operator who observes the picture image which is being operated upon, it is accompanied by the disadvantage that it is difficult to determine the logical equations required for generating a desired picture image, or subsequent animation thereof and a complicated circuit arrangement is required to represent a complicated picture image.

Accordingly, a general object of the present invention is to propose an improved system for electrically drawing the original pictures for caricature movies and the like.

Another object of the present invention is to propose an improved electrical curve-interpolation system, according to which it is possible to interpolate the intermediate figures between the two given different figures of a movable curve.

Still another object of the present invention is to propose an improved electrical system for curve interpolation, according to which the intermediate figures between two given different figures of a movable curve can be interpolated by providing the coordinates of predetermined separate points on the movable curve under the conditions before and after the movement thereof.

Still another object of the present invention is to provide an improved curve-plotting system, in which a curve to be represented is given in the form of cordinates of predetermined separate points thereon, and the intervals between these points are interpolated by suitable partial curves.

A further object of the present invention is to provide an improved curve-plotting system, according to which it is possible to produce a smooth curve only by providing a relatively limited number of coordinates.

Still another object of the present invention is to provide an improved curve-plotting system, in which a curve to be represented is given in the form of coordinates of predetermined separate points thereon and the intervals between these points are interpolated by suitable partial curves.

A further object of the present invention is to provide an improved curve-plotting system, according to which it is possible to produce a smooth curve only by providing a relatively limited number of coordinates.

Still a further object of the present invention is to provide an improved curve-plotting system, according to which it is possible to produce a smooth curve by using a relatively simple analog circuit.

A further object of the present invention is to provide an improved curve-plotting system which exhibits a remarkably slow response against the variation in the values of coordinates at the instants of the renewal of data.

These, as well as additional objects and advantages of the present invention will become more apparent from the following detailed description of the invention when taken in connection with the accompanying drawing, in which:

Figure 1:
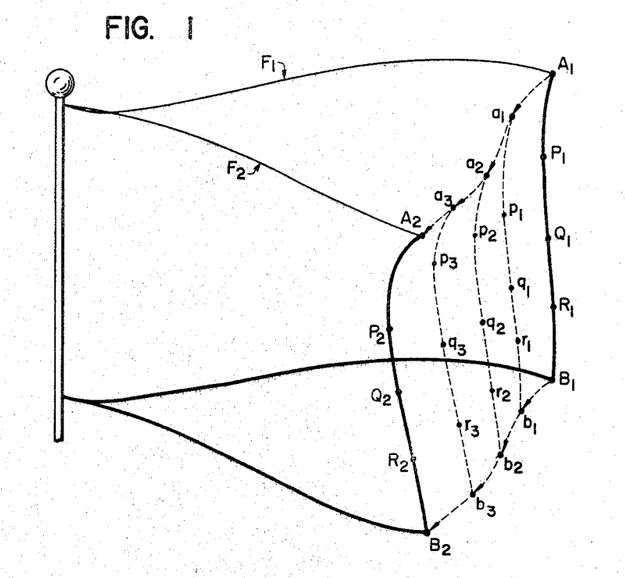
FIG. 1 is a picture for explaining the principle of the curve-interpolation system of the present invention.

The basic principle of the curve-interpolation system of the present invention will be first explained. FIG. 1 shows a flag which flutters in the wind between two different positions $F_1$ and $F_2$. It is now assumed that the two positions $F_1$ and $F_2$ are manually drawn on suitable sheets or papers, and that the interval between the two positions $F_1$ and $F_2$ is occupied by a suitable number of intermediate positions of the flag. For the convenience of explanation, only the one end portion of the flag, as shown in FIG. 1 will be considered in the following explanation. In FIG. 1, a curve $A_1B_1$ shows the appearance of the one end portion of the flag before movement thereof, and a curve $A_2B_2$ shows that end portion after slight movement. The portion of the flag moves from one position shown with the curve $A_1B_1$ to the other position shown with the curve $A_2B_2$, with accompanying variation in the position or shape thereof.

The terminal points $A_1$ and $B_1$, or $A_2$ and $B_2$, on the curve $A_1B_1$ or $A_2B_2$ will be hereinafter referred to as "specific points," and three separate points $P_1$, $Q_1$ and $R_1$, or $P_2$, $Q_2$ and $R_2$, thereon will be hereinafter referred to as "generic points." Curves $a_1b_1$, $a_2b_2$ and $a_3b_3$ shown in dotted line are intermediate curves to be interpolated. The terminal points $a_1$, $a_2$ and $a_3$, or $b_1$, $b_2$ and $b_3$ of the respective intermediate curves correspond to the specific points $A_1$ and $A_2$, or $B_1$ and $B_2$, of the given curves $A_1B_1$ and $A_2B_2$. These terminal points will be hereinafter referred to as "intermediate specific points." On the other hand, points $p_1$, $p_2$ and $p_3$, or $q_1$, $q_2$ and $q_3$, or $r_1$, $r_2$ and $r_3$, on the respective intermediate curves correspond to the generic points on the given curves $A_1B_1$ and $A_2B_2$, these points being hereinafter referred to as "intermediate generic points."

The coordinates of the specific points $A_1$, $A_2$, $B_1$ and $B_2$, the generic points $P_1$, $P_2$, $Q_1$, $Q_2$, $R_1$ and $R_2$, and the intermediate specific points $a_1$, $a_2$, $a_3$, $b_1$, $b_2$ and $b_3$ are given in advance, as hereinafter mentioned. Accordingly, it is required to determine the intermediate generic points $p_1$, $p_2$, $p_3$, etc. When the given curve $A_1B_1$ moves from the position $F_1$ shown in FIG. 1 to the position of the intermediate curve $a_1b_1$, it is considered that this movement is accompanied with the parallel displacement and rotation of coordinates and the expansion or contraction in dimension.

Generally speaking, when a given point $(x, y)$ moves to a different position, the new coordinates $(X, Y)$ can be expressed by the following equations:

$$X = k(x \cos \theta + y \sin \theta + C_x)$$
$$Y = k(-x \sin \theta + y \cos \theta + C_y)$$

(1)

where, $C_x$ and $C_y$ are the X and Y components of the parallel displacement, and $\theta$ is the angle of the rotation, and $k$ is the rate of the expansion or contraction, respectively.

Accordingly, if the coordinates of the specific points $A_1$ and $B_1$ in FIG. 1 are given as $(x_A, y_{A2})$, and $(x_{B1}, x_{B2})$, and if the coordinates of the intermediate specific points $a_1$ and $b_1$ are given as $(x_{a1}, y_{a1})$, and $(x_{b1}, y_{b1})$, the unknown constants $C_x$, $C_y$, $\theta$ and $k$ in the Equations 1 can be obtained by giving the above coordinates thereto. By obtaining these constants, the intermediate generic points $p_1$, $q_1$ and $r_1$, can be also determined from the Equations 1.

In this case, however, the solutions obtained by the above steps do not indicate any correct coordinates of the intermediate generic points $p_1$, $q_1$ and $r_1$, on the required intermediate curve $a_1b_1$, because these steps approximately determine the movements of the generic points $P_1$, $Q_1$ and $R_1$, on the curve $A_1B_1$ only in accordance with the movements of the specific points $A_1$ and $B_1$ thereon, and no consideration is paid to the final curve $A_2B_2$. Accordingly, it is impossible to correctly interpolate the intermediate curve $a_1b_1$ by the above step. For instance, if the first given curve $A_1B_1$ is a straight line and the second given curve $A_2B_2$ is a curved line, all the intermediate curves interpolated by the above steps are represented as straight lines, and no continuity between both given curves $A_1B_1$ and $A_2B_2$ can be maintained. In order to eliminate this disadvantage, the intermediate curve $a_1b_1$ obtained by the above steps are required to also correspond to the final curve $A_2B_2$.

According to the present invention, one group of coordinates of first interim intermediate generic points are determined in accordance with the first given curve $A_1B_1$, and the other group of coordinates of second interim intermediate generic points are determined in accordance with the second given curve $A_2B_2$.

The final intermediate generic points, such as $p_1$, $q_1$ and $r_1$ on the intermediate curve $a_1b_1$, are determined by adding these two groups of coordinates to each otherto obtain values proportionally allotted in accordance with the distances between the specific point $A_1$ or $A_2$ and the intermediate specific point $a_1$, for example. Thus, the intermediate curves $a_1b_1$, $a_2b_2$ and $a_3b_3$ can be determined without any handwriting process, by determining the specific and generic points of the given two curves $A_1B_1$ and $A_2B_2$, and the intermediate specific points $a_1$, $a_2$, $a_3$, $b_1$, $b_2$ and $b_3$.

Figure 2:
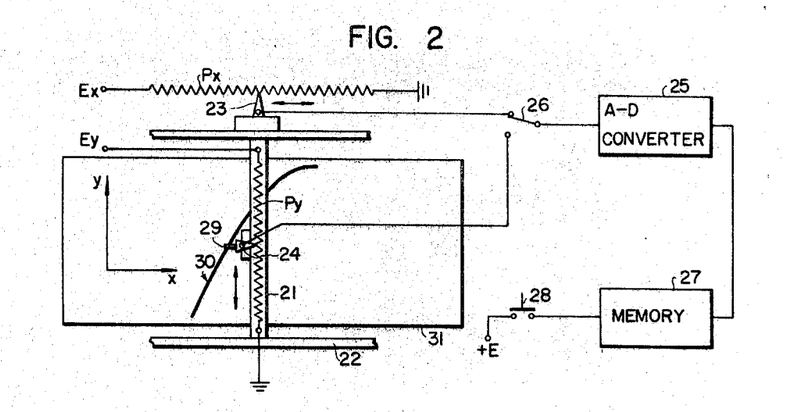
FIG. 2 shows a schematic diagram of a conventional curve-follower used in the system of the present invention.

The coordinates of the specific and generic points on the given curves $A_1B_1$ and $A_2B_2$, and those of the intermediate specific points of the intermediate curves $a_1b_1$, $a_2b_2$ and $a_3b_3$ are given by the known curve follower, as shown in FIG. 2, for example. In this figure, a movable bridge 21 is disposed on a fixed frame 22 to move in the horizontal direction. A movable contact 23 is fixed to one end of the bridge 21 so as to make contact with a potentiometer $Px$, for controlling the X-axis position of the bridge 21. Another potentiometer $Py$ for controlling the Y-axis position is disposed on the bridge 21, and a second movable contact 24 therefor is mounted so as to move along the bridge 21. One end of the potentiometer $Px$ is grounded, and the other end thereof is connected with a D.C. electric source $Ex$. The lower end of the potentiometer $Py$ is similarly grounded, and the upper end thereof is connected with a second D.C. source $Ey$. The electric contacts 23 and 24 are connected to an analog to digital converter 25 through an electric switch 26. The output signal from the converter 25 is transmitted to a memory 27. A pushbutton switch 28 connected to a D.C. source E is provided for controlling the memory 27. A tracer 29 is fixed to the movable electric contact 24 and is caused to move to trace a curve 30 drawn on a sheet 31, together with the contact 24.

For the purpose of reading out the coordinates of the separate points on the curve 30, the tracer 29 is moved, manually, and stopped at one of the predetermined points on the curve 30. The coordinates of this point can be read out from the potentiometer $Px$ and $Py$ in the form of electric voltages, and are introduced into the analog to digital converter 25 through the switch 26. The signals from the potentiometers $Px$ and $Py$ are converted into digital signals by the converter 25 and transmitted to the memory 27, wherein the coordinates of the points are stored in the form of digit informations.

It is of course necessary to previously determine at least two curves, indicating the beginning and final features of movable picture. These curves are drawn manually on the sheet 31 in FIG. 2, and the generic points on the curves are also previously determined. On the other hand, it is also necessary to determine the moving paths of the specific points of the above curves. For this purpose, these paths are also drawn manually on the sheet 31, and the intermediate specific points, that is, $a_1$, $a_2$, $a_3$, etc. in FIG. 1, are suitably determined.

Figure 3:
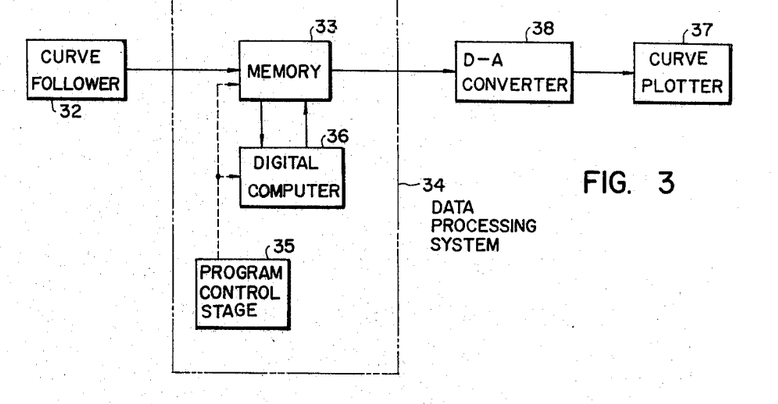
FIG. 3 shows a schematic diagram of one embodiment of the curve-interpolation system of the present invention.

FIG. 3 shows a schematic diagram of the system according to the present invention, including a curve follower 32, as shown in FIG. 2 for one example, by which the coordinates with respect to the specific and generic points on the curves, each indicating the beginning or final features of a movable picture to be interpolated, and with respect to the intermediate specific points on the moving paths of the above specific points, are read out as digital informations. The digital informations from the curve follower 32 are stored in a memory 33 provided as part of a data-processing system 34. The stored informations in the memory 33 are read out with a predetermined time-sequence under the control of a program control stage 35, and are transmitted to a digital computer 36. The digital computer 36 serves to obtain the coordinates of the intermediate generic points, such as $p_1$, $p_2$, $p_3$ and etc., as shown in FIG. 1. The results of the computation are transmitted to the memory 33, wherein they are stored together with the informations with respect to the specific points and intermediate specific points. The informations stored in the memory 33 are read out with a predetermined time-sequence under the control of the program control stage 35, and are transmitted to a curve plotter 37 through a suitable digital to analog converter 38, thereby the intermediate curves are interpolated and drawn on suitable sheets.

In the above description, the two conditions, that is, the curves $A_1B_1$ and $A_2B_2$, were taken into consideration. The present invention is not limited to these curves alone, but the other conditions can also be taken into consideration. For instance, in the case wherein the movable picture is a circle, it is possible to select the center point of the circle and a certain point thereon for the specific points. On the other hand, three or more points can be selected for the specific points. In this case, though the equations for transformation of the coordinate system are more or less complicated in comparison with the above-mention case, the principle for interpolation is the same as that case.

Figure 4:
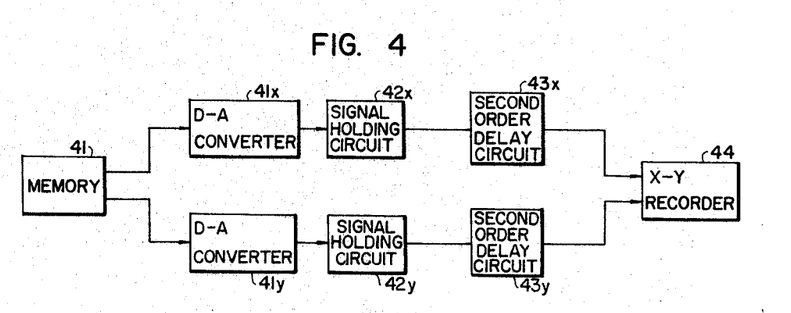
FIG. 4 shows a schematic diagram illustrating one embodiment of the curve-plotting system used in the curve-interpolation system of FIG. 3.

The curve plotter 37 can be composed, for example, of a so-called X-Y recorder and an analog operation circuit. FIG. 4 illustrates one embodiment of such curve plotter. In FIG. 4, a memory 41 corresponds to the memory 33 in FIG. 3. The coordinates with respect to the X-axis stored in the memory 41, are time-sequentially introduced to a first digital to analog converter $41x$, and the coordinates with respect to the Y-axis, to second digital to analog converter $41y$. The coordinates converted into analog signals by the converters $41x$ and $41y$ are introduced to first and second signal-holding circuits $42x$ and $42y$, respectively, thereby they are held for a predetermined period. Second order lag circuits $43x$ and $42y$ having a certain transfer function, $$\frac{1}{1+2aS+a^2S^2}$$

serve to connect circuits $42x$ and $42y$ to an X-Y recorder.

It is now considered that the analog signals indicating certain coordinates $(x_{j-1}, y_{i-1})$ are applied to transfer lag circuits $43x$ and $43y$, respectively, and the output signals thereof approach the given coordinates $(x_{j-1}, y_{i-1})$, after a predetermined lapse of time. At this instant, if the information corresponding to the new coordinates $(x_j, y_j)$ is taken out from the memory 41 under the control of the program control stage 35 of FIG. 3, the output signals of the holding circuits $42x$ and $42y$ are caused to step up or down. Consequently, the output analog signals of the transfer lag circuits $43x$ and $43y$ vary in accordance with the following equations:

$$x = x_{i-1} + (x_i - x_{i-1})\left(1 + \frac{t}{a}\right)e^{-\frac{t}{a}}$$

$$y = y_{i-1} + (y_i - y_{i-1})\left(1 + \frac{t}{a}\right)e^{-\frac{t}{a}} \quad (2)$$

If $t$ in the above equations is eliminated, the following equation can be obtained:

$$\frac{x - x_{i-1}}{y - y_{i-1}} = \frac{x_i - x_{i-1}}{y_i - y_{i-1}} \quad (3)$$

The Equation 3 indicates that there is a linear relation between $x$ and $y$.

In case that the second order lag circuits $43x$ and $43y$ tend to show some over-shoot characteristics, the interpolated curves include some projected portions at the intermediate generic points thereof. Accordingly, it is required to use transfer lag circuits which do not include any overshoot characteristics. Besides, it is necessary that the time-constants of both transfer lag circuit for X- and Y-axes coincide with each other.

Though it is also possible to substitute first order lag circuits for the second order lag circuits $43x$ and $43y$, the use of the first order lag circuits tends to create the disadvantage that the recorder 44 in FIG. 4 cannot accurately follow the variation in the output signals of the lag circuits, since the variation in the standing current of these circuits is usually very quick. On the other hand, third or fourth order lag circuits exhibit too much transfer lag to use for the transfer lag circuits in the embodiment of FIG. 4. Accordingly, the second order lag circuit are the most desirable elements therefor.

Figure 5:
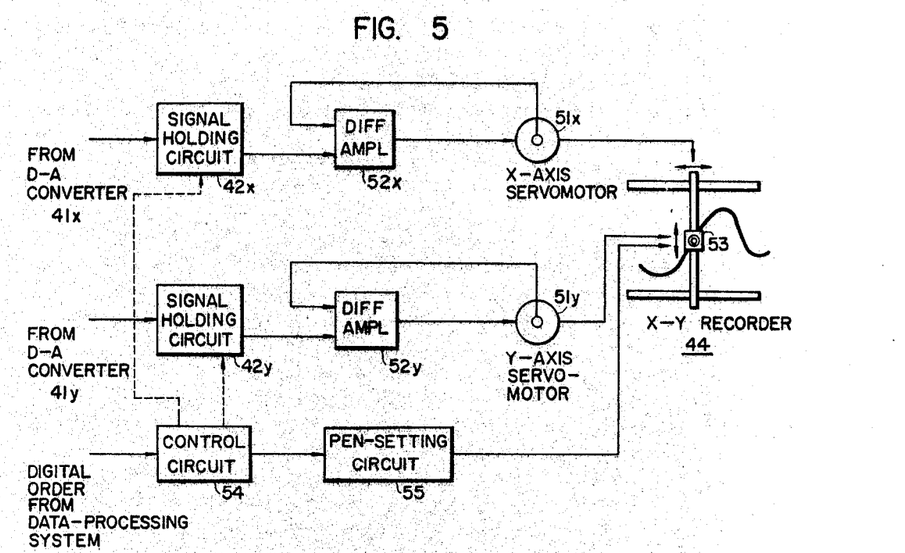
FIG. 5 shows a schematic diagram illustrating one modification of the curve-plotting system of FIG. 4.

It is possible to construct the second order lag circuits $43x$ and $43y$ in FIG. 4 by adequately assembling electric capacitors and resistors in the known manner. On the other hand, the X-Y recorder 44 can be replaced by the known cathode-ray oscilloscope and the like equipment. Moreover, it is also possible to use the responce characteristics of the X-Y record 44 itself for the second order lag circuits $43x$ and $43y$, as shown in FIG. 5. In FIG. 5, signal holding circuits $42x$ and $42y$ correspond to those in FIG. 4. The analog signals from the holding circuits are transmitted to X- and Y axis servomotors $51x$ and $51y$ through differential amplifiers $52x$ and $52y$, respectively, so as to drive the X-Y recorder 44. Though the detail of the servomotors $51x$ and $51y$ is omitted, signals indicating the position of a pen 53 of the recorder 44 are fed back to the differential amplifiers $52x$ and $52y$. Consequently, the servomotors $51x$ and $51y$ serve to drive the pen 53, and they are caused to stop at the coordinates given by the holding circuits $42x$ and $42y$. The coordinates to be set by the holding circuits $42x$ and $42y$ are controlled by a control circuit 54 which is caused to operate in accordance with the digital order from the data-processing system in FIG. 3, but the detail thereof is omitted. Consequently, the analog signals indicating the coordinates of the predetermined points on the curve to be represented are time-sequentially applied to the amplifiers $52x$ and $52y$ by the holding circuits $42x$ and $42y$ under the control of the control circuit 54. The control circuit 54 also control a pen-setting circuit 55 for seting the pen 53 of the X-Y recorder 44 during the desired periods.

According to the embodiments shown in FIG. 3, 4 and 5, it is possible to draw the required curves by merely providing the coordinates of the predetermined separate points thereon. However, every partial curves interpolated between any two given points is a straight line. Thus, it is impossible to obtain smooth curves with these embodiments.

Figure 6:
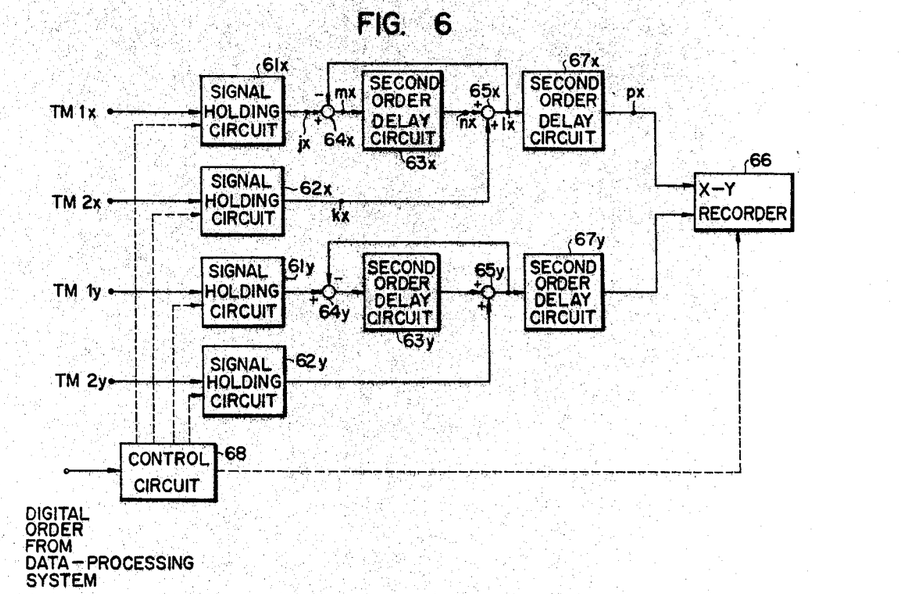
FIG. 6 shows a schematic diagram of another type of embodiment of the curve-plotting system which can be used in the curve-interpolation system of FIG. 3.
Figure 7A:
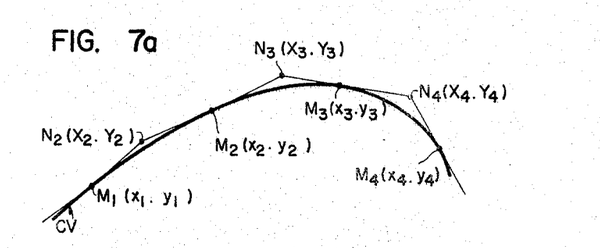
FIGS. 7a and 7b are characteristic diagrams illustrating the operation of the system of FIG. 6.

FIG. 6 illustrates another embodiment of the curve plotting system in accordance with the present invention. As shown in FIG. 7a, a curve CV to be represented is given in the form of the coordinates indicating separate points $M_1$, $M_2$, $M_3$, $M_4$, etc., similarly to the case of FIGS. 4 and 5. References $N_2$, $N_3$, $N_4$, etc., indicate the crossing points of the tangential lines extending from the respective adjacent points on the curve CV. In the embodiment shown in FIG. 6, these crossing points are used for the reference values together with the points on the curve CV.

Figure 7B:
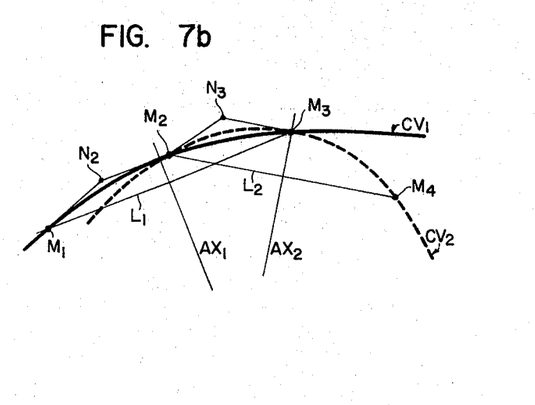

The coordinates of the crossing points $N_2$, $N_3$, etc., can be obtained by the operation of the data-processing system under the control of the predetermined program. Since the program per se does not form a specific part of the present invention, the details thereof are omitted herein. However, the principle for obtaining those coordinates should be briefly explained to provide a basis for understanding the present invention. FIG. 7b provides a sketch for explaining this principle, wherein the points $M_1$, $M_2$, $M_3$, $M_4$, etc., corresponding to the similar points in FIG. 7a. Though it is possible to obtain the coordinates of the crossing points by various methods, only one example thereof is shown in FIG. 7b. According to this method, three points adjoining each other, for example, $M_1$, $M_2$ and $M_3$, are selected to obtain one crossing point, for example, $N_2$. It is possible to assume one parabolic curve $CV_1$ passing through all of the three points $M_1$, $M_2$ and $M_3$, and having an axis $AX_1$ transverse to a straight line $L_1$ connecting between the terminal points $M_1$ and $M_3$. Under such condition, it is possible to obtain the crossing point $N_2$ of the tangential lines extending from the terminal points $M_1$ and $M_2$. The above operation can be carried out by the data-processing system in the known manner. Though the crossing point $N_2$ obtained does not coincide with the actual crossing point, more precise approximation can be obtained by more carefully selecting the distances between the points $M_1$, $M_2$, $M_3$, $M_4$, etc.

As is apparent from FIG. 7b, the crossing point $N_3$ can be obtained not only from the curve $CV_2$ but also from the curve $CV_1$. Accordingly, if the means value thereof is calculated, it is possible to more closely approach the assumed crossing point to the actual value. In any event, the data-processing system in FIG. 3 can serve to calculate the crossing points $N_2$, $N_3$, etc., of FIG. 7a, and to store them as well as the informations relating to the given points $M_1$, $M_2$, $M_3$, etc. The informations stored in memory are transmitted to signal holding circuits $61x$, $61y$, $62x$ and $62y$ (FIG. 6) after they are converted into analog signals by the known method. The output signals from the holding circuits $61x$ and $61y$ are applied to second order lag circuits $63x$ and $63y$ through adders $64x$ and $64y$, respectively. The output signals from the lag circuits $63x$ and $63y$ and the signals from the holding circuits $62x$ and $62y$ are applied to the other adders $65x$ and $65y$, respectively, wherein they are added to each other. The output signals of the adders $65x$ and $65y$ are applied to an X–Y recorder 66 through the other second order lag circuits $67x$ and $67y$. A part of the output signal of each adder $65x$ or $65y$ is fed back to the added $64x$ or $64y$, wherein it is added to the signal from the holding circuit $61x$ or $61y$ having opposite polarity thereto. A control circuit 68 is provided for controlling the above holding circuits and the X–Y recorder in accordance with the digital order from the data-processing system. As the circuit arrangement for the X-axis is the same as that for the Y-axis, the following description refers only to the X-axis.

Now consider than an input signal $x_1$ indicating the X-axis value of the point $M_1$ on the curve CV of FIG. 7a is applied to the signal holding circuit $61x$ through the input terminal $IT1x$ thereof, and that another input signal having a certain value $\xi_1$ is applied to the holding circuit $62x$ through the input terminal $TM2x$. The respective signals $x_1$ and $\xi_1$, are held in the signal holding circuits $61x$ and $62x$ under the control of the control circuit 68, during a predetermined period. Accordingly, the signal levels at the various points under the steady state are maintained as follows:

$j_x$ ---------------- $x_1$
$k_x$ ---------------- $\xi_1$
$l_x$ ---------------- $x_1$
$m_x$ ---------------- Zero
$n_x$ ---------------- $x_1 - \xi_1$
$p_x$ ---------------- $x_1$ Under such condition, the level of the signal applied to and held in the holding circuit $61x$ is changed from $x_1$ to $x_2$, and, at the same time, the level of the signal applied to and held in the holding circuit $62x$ is changed from $\xi_1$ to $\xi_2$, where, $\xi_2$ is the value given by the data-processing system in accordance with the following general equation:

$$\xi_i = \xi_{i-1} + X_i - x_{i-1} \qquad (4)$$

that is, $$\xi_2 = \xi_1 + X_{-1}$$

Immediately after the setting of the signals $x_2$ and $\xi_2$, the signal levels at the various points of the circuit are caused to change as follows:

$j_x$ ---------------- $x_1 \to x_2$.
$k_x$ ---------------- $\xi_1 \to \xi_2 = \xi_1 + X_2 - x_1$.
$l_x$ ---------------- $x_1 \to X_2$.
$m_x$ ---------------- zero $\to x_2 - X_2$.
$n_x$ ---------------- $x_1 - \xi_1$ (no change).
$p_x$ ---------------- $x_1$ (no change).

and, after the predetermined lapse of time, the respective signal levels reach the following values:

$j_k$ ---------------- $x_2$ (no change).
$k_x$ ---------------- $\xi_2$ (no change).
$l_x$ ---------------- $X_2 \to x_2$.
$m_x$ ---------------- $x_2 - X_2 \to$ zero.
$n_x$ ---------------- $x_1 - \xi_1 \to x_2 - \xi_2$.
$p_x$ ---------------- $x_1 \to x_2$.

As is apparent from the above description, the signal level at $l_x$ is $X_2$ at the time immediately after the setting of input signals to the holding circuits $61x$ and $62x$. This means that the lag circuit $67x$ is caused to operate toward the value $X_2$ as an interim reference value, at the beginning of the tracking process. During the operation of the circuits, the signal level $X_2$ at the point $l_x$ is caused to gradually change toward the new setting value $x_2$. Consequently, the output level of the lag circuit $67x$ finally approaches $x_2$. It is therefore possible to obtain the tracking signal for the required curve by applying new values to the signal holding circuits $61x$ and $62x$ with a predetermined time-sequence under the control of the control circuit 68. Though the explanation relating the Y-axis control has been omitted, such operation will be easily understood by a person skilled in the art by referring to the above description concerning the X-axis.

According to the embodiment of FIG. 6, it is possible to draw curves having a relatively smooth appearance in accordance with the informations about the coordinates of the predetermined separate points on the curves. In connection with this embodiment, however, it is required to calculate the crossing points of the tangential lines extending from the respective points on the curve by means of the data-processing system. The following embodiments relate to a curve-plotting system, according to which it is possible to draw smooth curves only by providing the coordinates of the separate points thereon.

In these embodiments, when the information concerning a number of points on the curve to be represented are given by $x_1, x_2 \ldots x_{i-1}, x_i, x_{i+1} \ldots$ for example, the interval between the specific two points $x_{i-1}$ and $x_i$ is interpolated by means of the following function:

$$F[\lambda(t), a, b \ldots]$$

where, $\lambda(t)$ is a function of time which varies from zero to unitary and $a, b \ldots$ are values obtained from the information including the point $x_i$ and a predetermined number of points of adjacent thereto, such as $x_{i-1}$, or $x_{i-1}$ and $x_{i+1}$. When an n-order equation ($n>1$) is used for the function F, the above values $a, b \ldots$ can be considered as coefficient of $\lambda(t)$. Accordingly, it is necessary to use two analog computing circuits, one of which is for producing the function of time $\lambda(t)$, and the other one of which is for calculating the coefficients $a, b \ldots$ from the informations about the given points. The function $$F[\lambda(t), a, b \ldots]$$

can be obtained as an analog signal by combining the outputs of the above two types of analog circuits. Transfer lag circuits, such as first or second order lag circuits, are adaptable for the circuits for obtaining the function of time $\lambda(t)$. On the other hand the coefficients $a, b \ldots$ can be obtained by directly adding the analog signals indicating the information of points.

Now consider that the coordinates $x$ and $y$ on a certain curve are expressed by the following equations, which parameter is a function of time $\lambda$;

$$x(\lambda) = a_x\lambda^3 + b_x^2 + c_x\lambda + k_xy(\lambda)$$
$$= a_y\lambda_3 + b_y\lambda^2 + c_y\lambda + k_y \quad (5)$$

where $a_x, b_x, c_x, a_y, b_y$ and $c_y$ are coefficients of the parameter $\lambda$, generally expressed with polynominals, and $k_2$ and $k_y$ are constants. Though the third order equations are shown here as one example, it is possible to use any equations of desirable order in accordance with the complexity of the curves to be produced, as hereinafter mentioned.

The relation between the parameter $\lambda$ and time can be also determined selectively. In this case, however, the relation expressed by the following equation is used for explanation:

$$d\lambda/dt = -\lambda + 1 \quad (6)$$

provided, $\lambda(O) = 0$. The parameter $\lambda$ determined by the Equation 6 can be also expressed by the following exponential equation:

$$\lambda(t) = 1 - e^{-t} \quad (7)$$

This equation indicates a first order lag system. As far as any stable conversion is possible; however, a second order lag system is also applicable.

The following equation is obtained from the Equations 5 and 7 (the following description being limited to $x$ for simplification):

$$x(t) = a_x(1-e^{-3t}) - (3a_x+b_x)(1-e^{-2t}) + (3a_x+2b_x+c_x)(1-e^{-t}) + K_x \quad (8)$$

Figure 8:
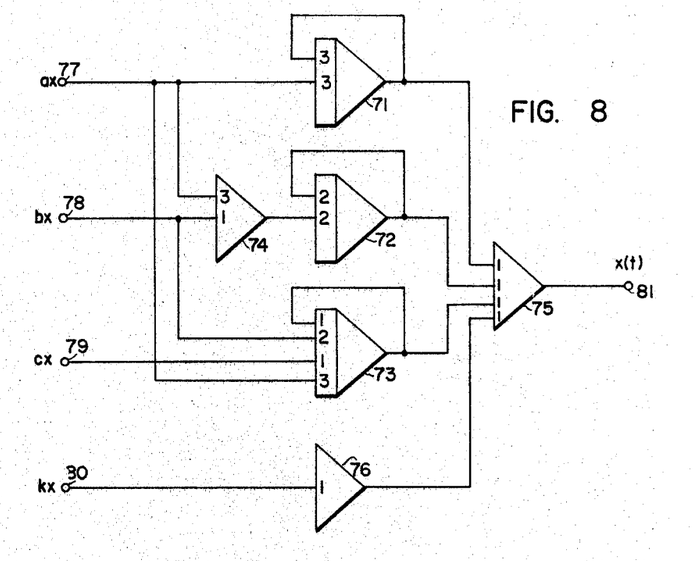
FIG. 8 shows a schematic diagram illustrating the principle of an improved embodiment of the curve-plotting system.

FIG. 8 illustrates an analog computer system which satisfies the above equation in principle.

In FIG. 8, integrators 71, 72 and 73 are each provided with a feedback circuit. These integrators have different feedback factors (1, 2 and 3), so that three kinds of first order lag circuits having different time constants, with ratio of 1:½:⅓, can be utilized. Also provided in the system are adders 74 and 75, and an inverter 76. The abovementioned coefficients $a_x, b_x$ and $c_x$ and the constant $K_x$ are applied to terminals 77, 78, 79 and 80, respectively. The first input signals $a_x$ is introduced to the integrators 71 and 73 and the adder 74, and the second input signal $b_x$ is introduced to the integrator 73 and the adder 74. Moreover, the third input signal $c_x$ is introduced to the integrator 73, and the fourth input signal $K_x$, to the inverter 76. The output signal from the adder 74, which indicates the coefficient $[-(3a_x+b_x)]$ in the Equation 8, is further introduced to the integrator 72. The integrator 71 serves to obtain the first member $$[a_x(1-e^{-3t})]$$

and the integrator 72 serves to obtain the second member $[-(3a_x+b_x)(1-e^{-2t})]$ of the equation; moreover, the integrator 73 serves to obtain the third member $$[(3a_x+2b_x+c_x)(1-e^{-t})]$$

thereof. The output signals from the integrators 71, 72 and 73 and the inverter 76 are added to each other by the adder 75, and the added signal is derived from a terminal 81.

The initial values $a_0, b_0, c_0$ and $K_0$ of the above coefficients and constant are applied to the respective input terminals 77, 78, 79 and 80, when all the output signals of the integrators 71, 72 and 73 are kept at zero value. At the instant $t=0$, only the constant $K_x$ is produced at the output terminal 81, that is, $x(o) = K_0$. After the lapse of enough time, namely, $t=\infty$, the sum value of the coefficients and constant approach:

$$x(\infty) = a_0 + b_0 + c_0 + K_0$$

If the predetermined increment values $$\triangleleft a, \triangleleft b, \triangleleft c \text{ and } \triangleleft k$$

are applied to the respective input terminals 77, 78, 79 and 80 after all of the circuits reach the steady state, the response of the circuit can be expressed with the following equation:

$$x(t) = \triangleleft a\lambda^3 + \triangleleft b\lambda^2 + \triangleleft c\lambda + \triangleleft K + (a_0 + b_0 + c_0 + k_0) \quad (9)$$

This means that the last input signals still remain as bias components, and only the increment values act on the circuit as the coefficients and constant with respect to $\lambda$. Consequently, according to the circuit arrangement of FIG. 8, it becomes possible to obtain the analog signal $x(t)$ which determines the variation in the X-axis value of the desired curve, by repeatedly setting the coefficients $a_x, b_x$ and $c_x$ and the constant $k_x$ at predetermined values with a certain interval of time. However, it is unnecessary to newly set the constant $k_x$ so far as the curve to be represented is continuous, since the finishing point of the last step coincides with the beginning point of the present step.

In order to produce the analog signals indicating the desired curves by means of the circuit of FIG. 8, it is required to settle the problem as to how those coefficients $a_x, b_x, c_x, a_y, b_y$ and $c_y$ and constants $k_x$ and $k_y$ in the Equation 5 can be introduced into the circuit. As mentioned above in connection with FIGS. 1, 2 and 3, the coordinates of a number of points on the curve to be produced are stored as digital informations in the memory of the data-processing system. Accordingly, it is more desirable that the output analog signals be produced in accordance with only the digital coordinates stored in the memory.

Figure 9:
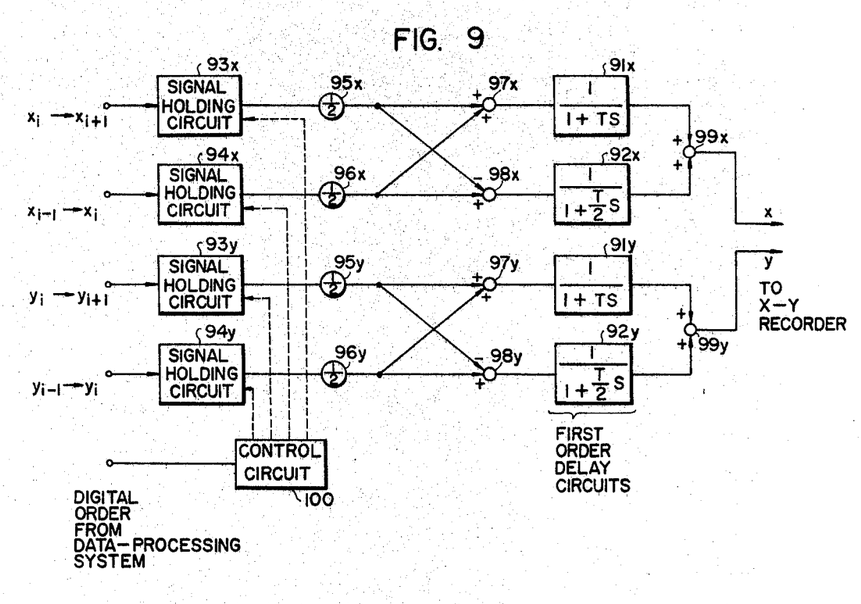
FIGS. 9, 10 and 12 show schematic diagrams illustrating three separate embodiments of curve-plotting systems employing the principle shown in FIG. 8.

FIG. 9 illustrates one embodiment of the invention which satisfies the above demand. In this embodiment, the second order equations with respect to $\lambda$ are used for $X(\lambda)$ and $Y(\lambda)$. The upper half of FIG. 9 is provided for the X-axis of the coordinates of the curve to be represented, and the lower half thereof is provided for the Y-axis. In the figure, references $91x$ and $91y$ show first order lag circuits having a transfer function $$\frac{1}{1+TS}$$

and references $92x$ and $92y$ show the other first order lag circuits having different transfer function $$\frac{1}{1+\frac{T}{2}S}$$

respectively. References $93x$ and $93y$ show signal holding circuits for setting the specific reference values, and references $94x$ and $94y$ show the other signal holding circuits for setting the specific set values (the final values of the output analog signals during each step of interpolation). Coefficient multipliers $95x, 95y, 96x$ and $96y$ having a coefficient value of ½, and adders $97x, 97y, 98x, 98y, 99x,$ and $99y$, respectively, are provided in the system. Marks "+" and "−" attached to the respective adders indicate the polarities of signals to be added thereby. Besides, a control circuit indicated by numeral 100 is for controlling the respective signal holding circuits 93x, 93y, 94x and 94y in accordance with the digital order from the data-processing system.

If considered that the values $x_i$ and $x_{i-1}$ are held by the holding circuits 93x and 94x, and the delay circuits 91x and 92x reach the steady state, the output signals $x_{91}$ and $x_{92}$ of the respective delay circuits can be expressed as follows:

$$x_{91} = \tfrac{1}{2}(x_{i-1}+x_i)$$
$$x_{92} = \tfrac{1}{2}(x_{i-1}-x_i) \quad (10)$$

Accordingly, the output signal $x(\infty)$ from the adder 99x reaches the following value:

$$x(\infty) = \tfrac{1}{2}(x_{i-1}+x_i) + \tfrac{1}{2}(x_{i-1}-x_i) = x_{i-1} \quad (11)$$

Under such condition, the value $x_i$ is set in the holding circuit 94x, and the value $x_{i+1}$ is set in the holding circuit 93x, under the control of the circuit 100. Since the output waveforms of the respective delay circuits 91x and 92x vary in accordance with $$\left(1 - e^{-\tfrac{t}{T}}\right)$$

and $$\left(1 - e^{-\tfrac{2t}{T}}\right)$$

the output signals $x_{91}$ and $x_{92}$ thereof can be expressed as follows:

$$x_{91} = \tfrac{1}{2}\left[(x_{i-1}+x_i) + (x_i+X_{i+1}) - (x_{i-1}+x_i)\left(1-e^{-\tfrac{t}{T}}\right)\right]$$
$$x_{92} = \tfrac{1}{2}\left[(x_{i-1}-x_i) + (x_i-x_{i+1}) - (x_{i-1}+x_i)\left(1-e^{-\tfrac{2t}{T}}\right)\right] \quad (12)$$

In this case, if it is given that $$1 - e^{-\tfrac{t}{T}} = \lambda \quad (13)$$

the following relation can be obtained:

$$1 - e^{-\tfrac{2t}{T}} = -1 + 2e^{-\tfrac{2t}{T}} + 2 - 2e^{-\tfrac{t}{T}}$$
$$= -\left(1-e^{-\tfrac{t}{T}}\right)^2 + 2\left(1-e^{-\tfrac{t}{T}}\right)$$
$$= -\lambda^2 + 2\lambda \quad (14)$$

Accordingly, the output signal $x$ of the adder 99x can be expressed as follows:

$$x = x_{i-1} + \tfrac{1}{2}(x_{i+1}-x_{i-1})\lambda$$
$$+ \tfrac{1}{2}(-x_{i+1}+2x_i-x_{i-1}) \cdot (-\lambda^2+2\lambda)$$
$$= x_{i-1} + \tfrac{1}{2}(-x_{i+1}+4x_i-3x_{i-1})\lambda$$
$$+ \tfrac{1}{2}(x_{i+1}-2x_i+x_{i-1})\lambda^2 \quad (15)$$

In the above Equation 15, if such a condition as $t=0$, namely, $\lambda=0$, is given, the value of $x$ becomes $x_{i-1}$ which is the final value of the last step. On the other hand, if such a condition as $t=\infty$, namely, $\lambda=1$, is given, the value of $x$ becomes $x_i$ which is the final value of the present step. In other words, the interval between the points $x_{i-1}$ and $x_i$ is interpolated by the second order equation with using the final value $x_{i+1}$ in the next step as the reference value.

Similarly to this, the value of $y$ is obtained by the lower half of the circuit arrangement of FIG. 9. The equation of the signal obtained by this circuit is as follows:

$$y = y_{i-1} + \tfrac{1}{2}(-y_{i+1}+4y_i-3y_{i-1})\lambda +$$
$$\tfrac{1}{2}(y_{i+1}-2y_i+y_{i-1})\lambda^2 \quad (16)$$

Besides, if calculated the differential coefficients $dx/d\lambda$ and $dy/d\lambda$ at $\lambda=1$:

$$\frac{dx}{d\lambda} = \frac{x_{i+1}-x_{i-1}}{2} \quad (17)$$

$$\frac{dx}{d\lambda} = \frac{y_{i+1}-y_{i-1}}{2} \quad (18)$$

The analog signals $x$ and $y$ are applied to the deflection terminals of a cathode-ray tube, or an X-Y recorder, and then a parabolic curve extending from the point $(x_{i-1}, y_{i-1})$ to the point $(x_i, y_i)$ can be represented. An equation indicating a parabolic curve can be obtained by eliminating $\lambda$ from the Equations 15 and 16. Moreover, the inclination $dy/dx$ of the curve at the point $(x_i, y_i)$ can be calculated from the Equations 17 and 18, that is, $$\frac{dy}{dx} = \frac{\frac{dy}{d\lambda}\big|_{\lambda=1}}{\frac{dx}{d\lambda}\big|_{\lambda=1}} = \frac{y_{i+1}+y_{i-1}}{x_{i+1}+y_{i-1}} \quad (19)$$

This inclination coincides with that of the straight line connecting the final value in the last step and the reference value in the present step (the final value in the next step).

As is apparent from the above description, according to circuit arrangement of FIG. 9, it is possible to interpolate with partial parabolic curves between the respective two points adjacent each other by repeatedly setting the coordinates of the points on the curve to be represented. Accordingly, the data required for the interpolation by this embodiment is only the coordinates of such curve.

It is possible to set new values to the signal holding circuits before the outputs of the transfer lag circuits completely reach the steady state thereof (for example, $t=4T$), because such setting operation brings no considerable error in practice. Moreover, since the final value in each step is given by the coordinates themselves of the points on the curve, the resulting curve passes through the predetermined points without failure.

It is possible to newly set the reference and final values with a fixed time-interval, since the error included in the output analog signals reduces to less than a predetermined value after the lapse of such interval. This is very convenient for the use of the circuit arrangement.

By using the transfer lag circuits, the response of the system becomes slow against the variation in the input signal level, and then pulse-like noise not only can be eliminated, but it is also possible to obtain such curve that the variation in the direction of the tangential lines thereon is continuous.

Figure 10:
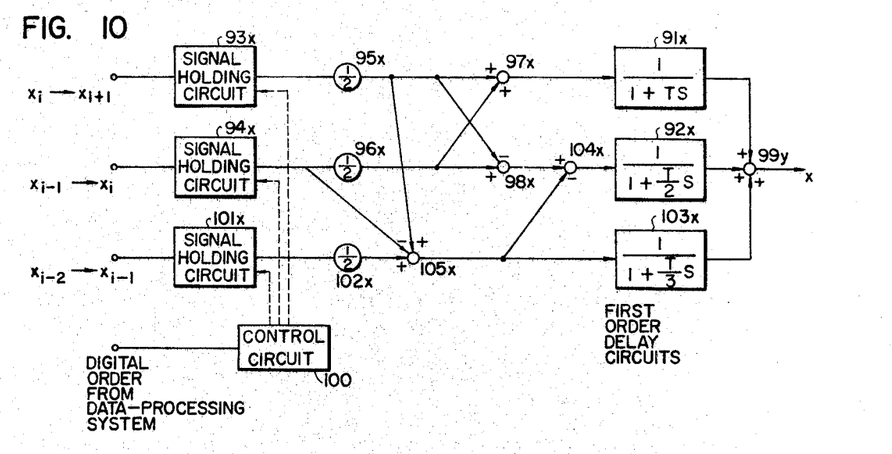

In the above-described embodiment, the intervals between the respective points are interpolated with parabolic curves. However, it is also possible to interpolate with higher order curves than the second order. FIG. 10 illustrates one modification of the embodiment of FIG. 9, in which an interpolation based upon the third order curves is utilized. Though this figure shows only the circuit for the X-axis, it should be apparent that similar circuit is also provided for the Y-axis. In this figure, the same reference numeral as those used in FIG. 9 indicate similar elements in the two figures.

The circuit arrangement of FIG. 10 differs from the arrangement of FIG. 9 in that it is provided with an additional signal holding circuit 101x for setting the final value in the last interpolation step, an additional multiplier 102x, and an additional first order lag circuit 103x having a transfer function $$\frac{T}{1+\tfrac{T}{3}S}$$

Additional adders 104x and 105x are also provided.

In FIG. 10, it is considered that the signals $x_i$, $x_{i-1}$ and $x_{i-2}$ are set to the signal holding circuits $93x$, $94x$ and $101x$, respectively, and that the output signals of the lag circuit $91x$, $92x$ and $103x$ have already reached the steady state thereof; these output signals $x_{91}$, $x_{92}$ and $x_{103}$ are expressed as follows:

$$x_{91} = \tfrac{1}{2}(x_{i-1}+x_i)$$
$$x_{92} = \tfrac{1}{2}(-x_{i-2}+3x_{i-1}-2x_i) \quad (20)$$
$$x_{103} = \tfrac{1}{2}(x_{i-2}-2x_{i-1}+x_i)$$

Accordingly, the output $x(\infty)$ of the adder $99y$ is given by $$x(\infty) = x_{91}+x_{92}+x_{103}$$
$$= x_{i-1} \quad (21)$$

When the input signals $x_{i+1}$ and $x_i$ and $x_{i-1}$ are set to the respective signal holding circuits $93x$, $94x$ and $101x$, as shown in FIG. 10, the output signal $x$, which is a sum value of the outputs of the lag circuits $91x$, $92x$ and $103x$, becomes such a value that the following equation is added to the abovementioned Equation 15:

$$x_a = -\tfrac{1}{2}\Big[(x_{i-2}-2x_{i-1}+x_i)+\{(x_{i-1}-2x_i+x_{i+1})$$
$$-(x_{i-2}-2x_{i-1}+x_i)\}\Big(1-e^{\frac{-2t}{T}}\Big)\Big]$$
$$+\tfrac{1}{2}\Big[(x_{i-2}-2x_{i-1}+x_i)+\{(x_{i-1}-2x_i+x_{i+1})$$
$$-(x_{i-2}-2x_{i-1}+x_i)\}\Big(1-e^{\frac{-3t}{T}}\Big)\Big]$$
$$(22)$$

Simplified this equation becomes:

$$x_a = \tfrac{1}{2}(-x_{i-2}+3x_{i-1}-3x_i+x_{i+1})\Big(1-e^{\frac{-t}{T}}\Big)e^{\frac{-2t}{T}} \quad (23)$$

From the Equations 13 and 14, the following relationship can be obtained:

$$\Big(1-e^{\frac{-t}{T}}\Big)e^{\frac{-2t}{T}} = \lambda(1-\lambda)^2 \quad (24)$$

Consequently, the Equation 23 is rewritten as follows:

$$x_a = \tfrac{1}{2}(-x_{i-2}+3x_{i-1}-3x_i+x_{i+1})(1-\lambda^2)\lambda \quad (25)$$

Thus, the output signal $x$ can be expressed as follows by adding the above Equation 25 to the Equation 15:

$$x = x_{i-1}+\tfrac{1}{2}(-x_{i-2}+x_i)\lambda+\tfrac{1}{2}(x_{i+1}-2x_i+x_{i-1})\lambda^2$$
$$+\tfrac{1}{2}(x_{i-2}-3x_{i-1}+3x_i-x_{i+1})\lambda^3 \quad (26)$$

In this equation, when such a condition as $t=0$, namely, $\lambda=0$, is given, the value of $x_{i-1}$ which is the final value in the last step, and when such a condition as $t=\infty$, namely, $\lambda=1$, is given, the value of $x$ becomes $x_i$ which is the final value in the present step. In other words, the interval between the points $x_{i-1}$ and $x_i$ is interpolated by the third order equation using the final value $x_{i+1}$ in the next step as the reference value.

Though the detailed explanation relating to the Y-axis signal was omitted, the signal $y$ can be obtained by a similar circuit arrangement to that for the X-axis. The equation of $y$ can be expressed as follows:

$$y = y_{i-1}+\tfrac{1}{2}(-y_{i-2}+y_i)\lambda+\tfrac{1}{2}(y_{i+1}-2y_i+y_{i-1})\lambda^2$$
$$+\tfrac{1}{2}(y_{i-2}-3y_{i-1}+3y_i-y_{i+1})\lambda^3 \quad (27)$$

The inclination $dy/dx$ at the point $(x_i, y_i)$ of the resultant curve is given by:

$$\frac{dy}{dx} = \frac{\frac{dy}{d\lambda}\big|_{\lambda=1}}{\frac{dx}{d\lambda}\big|_{\lambda=1}} = \frac{y_{i+1}-y_{i-1}}{x_{i+1}-x_{i-1}} \quad (28)$$

This inclination coincides with that in the embodiment of FIG. 9. In the meantime, the inclination $dy/dx$ at the point $(x_{i-1}, y_{i-1})$ is given by:

$$\frac{dy}{dx} = \frac{\frac{dy}{d\lambda}\big|_{\lambda=0}}{\frac{dx}{d\lambda}\big|_{\lambda=0}} = \frac{y_i-y_{i-1}}{x_i-x_{i-2}} \quad (29)$$

This means that the inclination at the starting point in each interpolation step coincides with the final inclination in the last step. Accordingly, it is possible to represent a curve having no folded point with this embodiment.

Figure 11:
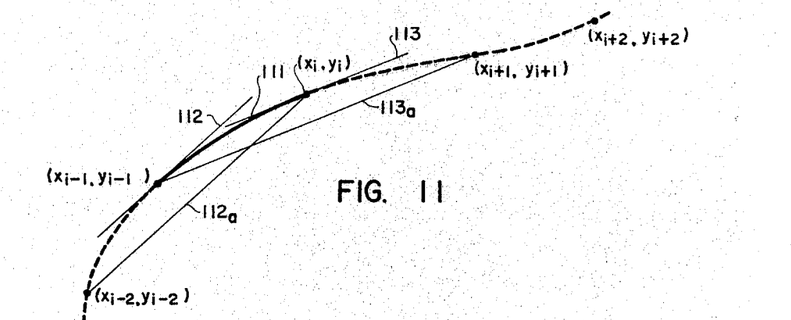
FIG. 11 is a schematic diagram illustrating the operation of the embodiment of FIG. 10.

In case that the analog signals $x$ and $y$ obtained by the present invention are applied to a cathode-ray tube or X-Y recorder, the locus of the curve is represented as shown in FIG. 11. As is apparent from the figure, the locus of the points of the curve is represented by the third order curve 111 which varies from one point $(x_{i-1}, y_{i-1})$ to the other point $(x_i, y_i)$, and the directions of the tangential lines 112 and 113 on the above two points becomes parallel to the straight lines connecting between the points $(x_{i-2}, x_{i-2})$ and $(x_i, y_i)$, and between the points $(x_{i-1}, y_{i-1})$ and $(x_{i+1}, y_{i+1})$, respectively.

If the respective signal holding circuits are newly set at the values $x_{i+2}$, $x_{i+1}$ and $x_i$, and $y_{i+2}$, $y_{i+1}$ and $y_i$ after the whole circuit reaches the steady state thereof (for example, T=4T), the locus of the curve 111 moves from the present point $(x_i, y_i)$ to the next point $(x_{i+1}, y_{i+1})$. At this time, the curve 111 continues without including any folded portions because the direction of the tangential line 113 at the point $(x_i, y_i)$ is not influenced by applying the new set values. By repeating a similar operation, it is possible to represent the smooth curve only by supplying the information concerning the number of points thereon under the control of the control circuit 100 in FIG. 10.

According to the embodiment shown in FIG. 10, it is impossible to avoid complication in the circuit arrangement thereof, since the third order equation is used for producing the desired curve. However, this embodiment has the features that the trangential lines on the curve vary continuously, and the equation for interpolation, is symmetrical, that is, even if the train of points of interpolation, for example, $x_{i-1}$, $x_i$, $x_{i+1}$ . . . is selected in the reverse order to that in FIGS. 10 and 11, it is possible to obtain a similar curve. According to the embodiment of FIG. 10, it is of course possible to reduce the error in the output signals.

Figure 12:
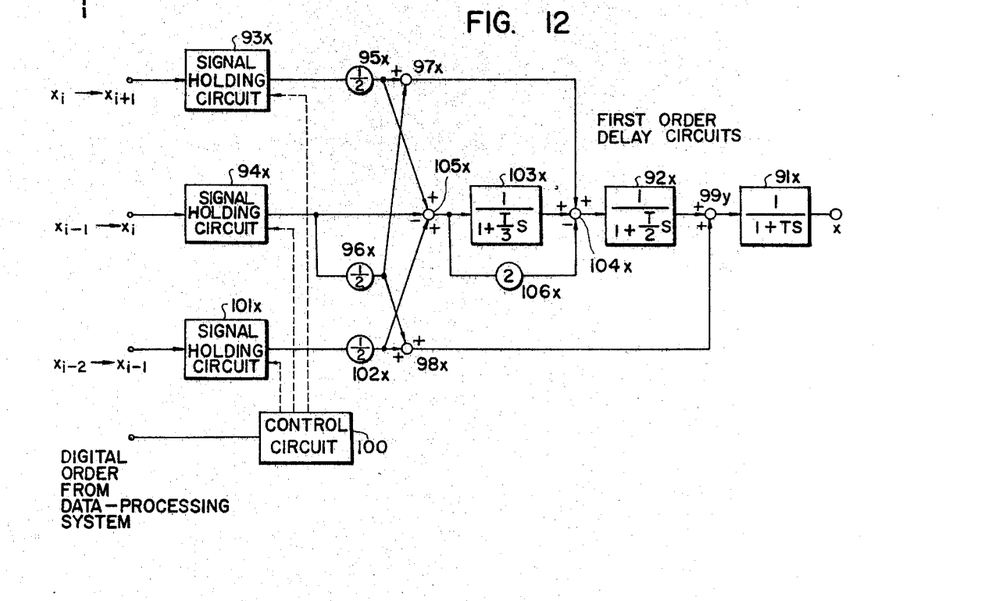

FIG. 12 illustrates another modification of the circuit arrangement of FIG. 9, which differs from the circuit arrangement of FIG. 10 in that the transfer lag circuits are connected in series. In FIG. 12, the same references as those in FIGS. 9 and 10 indicate the same elements in these figures. A coefficient multiplier $106x$ is provided having a transfer function of two, namely, a coefficient value of two.

Though the detailed explanation of the operation of the embodiment of FIG. 12 is omitted, this operation should be apparent from the above description relating to FIGS. 10 and 11 to a person skilled in the art. According to the embodiment of FIG. 12, it is possible to substitute the last lag circuit $91x$ for a cathode-ray oscilloscope of X-Y recorder which has a response characteristic corresponding to the transfer function $$\frac{1}{1+TS}$$

of the last delay circuit.

We explained the circuit arrangements of FIGS. 4, 5, 6, 9, 10 and 11 in connection with the curve-interpolation system for electrically interpolating figures between two given different figures for the movies and the like. However, the utility of these curve-plotting systems is not limited thereto, but they are also available for conventional analog computers or curve-plotting systems for general purpose, and numerical control systems and the like.

Moreover, while we have shown and described only a few embodiments of the present invention, it will be understood that the invention is not limited thereto but is susceptible of numerous changes and modifications as known to a person skilled in the art, and, we therefore do not wish to be limited to the details shown and described herein but intend to cover all such modifications and changes as are within the ability of one of ordinary skill in the art.

We claim:

1. A curve-plotting system comprising:
   means for time-sequentially producing analog signals indicating coordinate values of two separate points adjoining each other on a curve to be represented, with a predetermined order, including a plurality of signal holding circuits for selectively holding the analog signals indicating the coordinate values of the separate points;
   a first first-order transfer lag circuit having a transfer function
   $$\frac{1}{1+TS}$$
   a second first-order transfer lag circuit having a transfer function
   $$\frac{1}{1+\frac{T}{2}S}$$
   a first adder circuit inserted between said first transfer lag circuit and said signal holding circuits, for adding the signals from said signal holding circuits to each other to supply the sum value thereof to said first transfer lag circuit;
   a second adder circuit inserted between said second transfer lag circuit and said signal holding circuits, for differentially adding the signals from said signal holding circuits to each other to supply the sum thereof to said second transfer lag circuit; and
   a third adder circuit connected with said first and second transfer lag circuits, for adding the output signals of said transfer lag circuits to each other.

2. A curve-plotting system comprising:
   first, second and third signal holding circuits for holding analog signals indicating coordinate values of three separate points adjoining each other on a curve to be represented;
   means for time-sequentially producing the coordinate value of the set point in the next step to said first signal holding circuit, the coordinate value of the set point in the present step to said second holding circuit, and the coordinate value of the set point in the last step, respectively;
   first, second and third first-order lag circuits connected in parallel relation and having different transfer functions
   $$\frac{1}{1+TS},\ \frac{1}{1+\frac{T}{2}S}\ \text{and}\ \frac{1}{1+\frac{T}{3}S}$$
   respectively;
   means for analogically operating upon the signals from said first, second and third signal holding circuits, selectively, and to supply the results of the operation to said first, second and third transfer lag circuits; and
   means for suitably combining the signals from said respective transfer lag circuits to produce an output analog signal indicating the curve to be represented.

3. A curve-plotting system comprising:
   first, second and third signal holding circuits for holding analog signals indicating coordinate values of three separate points adjoining each other on a curve to be represented;
   means for time-sequentially producing the coordinate value of the set point in the next step to said first signal holding circuit, the coordinate value of the set point in the present step to said second holding circuit, and the coordinate value of the set point in the last step, respectively;
   first, second and third first-order lag circuits provided in cascade and having different transfer functions
   $$\frac{1}{1+TS},\ \frac{1}{1+\frac{T}{2}}\ \text{and}\ \frac{1}{1+\frac{T}{2}S}$$
   respectively;
   means for analogically operating upon the signals from said three signal holding circuits to supply the result of the operation to said third lag circuit;
   means for analogically operating upon the signals from said three signal holding circuits and the signal from third transfer lag circuit to supply the result of the operation to said second transfer lag circuit;
   means for analogically operating upon the signals from said second and third signal holding circuits and the signal from said second transfer lag circuit to supply the result of the operation to said first transfer lag circuit; and
   means for deriving an output signal indicating the curve to be represented from said first transfer lag circuit.

4. A system for electrically interpolating intermediate figures between two given different figures, comprising:
   first means for storing coordinate values of predetermined separate points on curves forming the two given figures, in the form of digital information;
   second means for storing coordinate values of predetermined separate points on curves forming given movement paths of the specific points selected from said separate points on the curves forming the two given figures, in the form of digital information;
   third means for calculating coordinate values of midway points to be located on the curves forming the intermediate figures and for storing them in the form of digital information;
   fourth means for time-sequentially deriving the coordinate values from said first, second and third means with a predetermined order;
   fifth means for converting the coordinate values from said fourth means into analog signals;
   sixth means for time-sequentially producing and holding said analog signals during a predetermined period; and
   seventh means for analogically operating the signals from said sixth means to produce an output analog signal indicating the curve to be represented.

5. A system according to claim 4, wherein said seventh means is provided with an analog operation circuit arrangement including at least one transfer lag circuit having characteristic that the input to output ratio thereof gradually varies from zero to unity with time.

6. A system according to claim 4, wherein said third means is so constructed as to calculate and store coordinate values with respect to the crossing points of the tangential lines extending from the respective specific and midway points on the curves forming the intermediate figures.

7. An analog system for electrically interpolating between two given points on a curve to be represented, which comprises:
   first signal means for producing a first analog signal indicating coordinates of the final point in each interpolation step;

second signal means for producing at least one second analog signal indicating coordinates of a predetermined reference point in each interpolation step;

means for repeatedly renewing the coordinates of said final and reference points produced by said first and second signal means to new values corresponding to the present interpolation step; and analog operation means for analogically operating upon the signals from said first and second signal means to produce an output analog signal indicating the curve to be represented, whereby the interval between the respective final points in the last and present interpolation steps is analogically interpolated.

8. An analog interpolation system according to claim 7, wherein said analog operation means includes a plurality of transfer lag circuits having the characteristics that the input to output ratio thereof gradually varies from zero to unity with time.

9. An analog interpolation system according to claim 7, wherein said second analog signal is given by the crossing point of the tangential lines extending from the final points of the present and next interpolation steps.

10. An analog interpolation system according to claim 7, wherein said second analog signal is given by the final point in the next interpolation step.

11. An analog interpolation system according to claim 7, wherein said second analog signals are given by at least one of the final points in the preceding interpolation steps, and by at least one of the final points in the subsequent interpolation steps.

12. An analog interpolation system according to claim 11, wherein said second analog signals are given by the final points in the last and next interpolation steps.

13. An analog system for electrically interpolating between two given points on a curve to be represented, which comprises:

a first signal means for producing a first analog signal indicating coordinates of the final point in each interpolation step;

a second signal means for producing a second analog signal indicating coordinates of the crossing point of the tangential lines extending from the respective final points in the present and next interpolation steps;

means for repeatedly renewing the coordinates of said final and reference points produced by said first and second signal means to new values corresponding to the present interpolation step; and analog operation means for analogically operating upon the signals from said first and second signal means to produce an output analog signal indicating the curve to be represented; and said analog operation means being composed of first and second transfer lag circuits coupled in cascade with said signal means, a first signal adding means for adding the signal from said second signal means to the output signal from said first transfer lag circuit to supply the sum value thereof to said second transfer lag circuit, and a second signal adding means for differentially adding said sum value to the signal from said first signal means to supply the differential value thereof to said first transfer lag circuit.

14. An analog interpolation system according to claim 13, wherein said first and second transfer lag circuits are composed of a second order lag circuit.

15. An analog system for electrically interpolating between two given points on a curve to be represented, which comprises:

a first signal means for producing a first analog signal indicating coordinates of the final point in each interpolation step;

a second signal means for producing a second analog signal indicating coordinates of the final point (as reference point) in the next interpolation step;

means for repeatedly renewing the coordinates of said respective final points produced by said signal means to new values corresponding to the present interpolation step;

a first first-order transfer lag circuit having a transfer function $$\frac{1}{1+TS}$$

a second first-order transfer lag circuit having a transfer funtion $$\frac{1}{1+\frac{T}{2}S}$$

a first adder circuit inserted between said first transfer lag circuit and said both signal means, for adding the signals from said both signal means to each other to supply the sum thereof to said first transfer lag circuit;

a second adder circuit inserted between said second transfer lag circuit and said both signal means, for differentially adding the signals from said both signal means to each other to supply the sum thereof to said second transfer lag circuit; and a third adder circuit connected with said first and second transfer lag circuits, for adding the output signals of said transfer lag circuits to each other.

16. An analog system for electrically interpolating between two given points on a curve to be represented, which comprises:

a first signal means for producing a first analog signal indicating coordinates of the final point in each interpolation step;

second and third signal means for producing second and third analog signals indicating coordinates of the final points (as reference points) in the last and next interpolation steps, respectively;

first, second and third first-order lag circuits connected in parallel relation and having transfer functions $$\frac{1}{1+TS}, \frac{1}{1+\frac{T}{2}S} \text{ and } \frac{1}{1+\frac{T}{3}S}$$

respectively means for analogically operating upon the signals said three signal means, selectively, and to supply the results of the operation to said first, second and third transfer lag circuits; and means for suitably combining the signals from said respective transfer lag circuits to produce an output analog indicating the curve to be represented.

17. An analog system for electrically interpolating between two given points on a curve to be represented, which comprises:

a first signal means for producing a first analog signal indicating coordinates of the final point in each interpolation step;

second and third signal means for producing second and third analog signals indicating coordinates of the final points (as reference points) in the last and next interpolation steps, respectively;

first, second and third first-order lag circuits provided in cascade and having different transfer functions $$\frac{1}{1+TS}, \frac{1}{1+\frac{T}{2}S} \text{ and } \frac{1}{1+\frac{T}{3}S}$$

respectively;

means for analogically operating upon the signals from said three signal means, to supply the result of the operation to said third lag circuit;

means for analogically operating upon the signals from said three signal means and the signal from said third transfer lag circuit to supply the result of the operation to said second transfer lag circuit;

means for analogically operating upon the signals from said first and second signal means and the signal from said second transfer lag circuit to supply the result of the operation to said first transfer lag circuit; and means for deriving an output signal indicating the curve to be represented from said first transfer lag circuit.

References Cited

UNITED STATES PATENTS

| | | | |
|---|---|---|---|
| 3,246,130 | 4/1966 | Rubin | 235—197 |
| 3,252,101 | 5/1966 | Gorbatenko | 328—142 |
| 3,372,268 | 3/1968 | Hoernes | 235—151.11 |
| 3,412,240 | 11/1968 | Hunt et al. | 235—197 |

MALCOLM A. MORRISON, Primary Examiner

J. F. RUGGIERO, Assistant Examiner

U.S. Cl. X.R.

235—150.53, 197